United States Patent
Dong et al.

(10) Patent No.: US 12,203,182 B2
(45) Date of Patent: Jan. 21, 2025

(54) PREPARATION METHOD AND APPLICATION OF NON-NOBLE METAL SINGLE ATOM CATALYST

(71) Applicant: Jiangnan University, Wuxi (CN)

(72) Inventors: Yuming Dong, Wuxi (CN); Guangli Wang, Wuxi (CN); Pingping Jiang, Wuxi (CN); Huizhen Zhang, Wuxi (CN); Liang Jian, Wuxi (CN); Ji Li, Wuxi (CN); Yongfa Zhu, Wuxi (CN); Chengsi Pan, Wuxi (CN); Jinze Lv, Wuxi (CN); Yan Leng, Wuxi (CN); Pingbo Zhang, Wuxi (CN)

(73) Assignee: Jiangnan University, Wuxi (CN)

( * ) Notice: Subject to any disclaimer, the term of this patent is extended or adjusted under 35 U.S.C. 154(b) by 528 days.

(21) Appl. No.: 17/507,009

(22) Filed: Oct. 21, 2021

(65) Prior Publication Data

US 2022/0042184 A1 Feb. 10, 2022

Related U.S. Application Data

(63) Continuation of application No. PCT/CN2020/108806, filed on Aug. 13, 2020.

(30) Foreign Application Priority Data

Aug. 16, 2019 (CN) .......................... 201910758076.3

(51) Int. Cl.
| | | |
|---|---|---|
| B01J 27/24 | (2006.01) | |
| C25B 1/04 | (2021.01) | |
| C25B 9/17 | (2021.01) | |
| C25B 11/02 | (2021.01) | |
| C25B 11/049 | (2021.01) | |
| C25B 11/091 | (2021.01) | |
| H01M 8/0656 | (2016.01) | |

(52) U.S. Cl.
CPC .............. *C25B 11/049* (2021.01); *C25B 1/04* (2013.01); *C25B 9/17* (2021.01); *C25B 11/02* (2013.01); *C25B 11/091* (2021.01); *H01M 8/0656* (2013.01)

(58) Field of Classification Search
None
See application file for complete search history.

(56) References Cited

U.S. PATENT DOCUMENTS

2011/0113677 A1* 5/2011 Woods .................... C11C 3/003
554/170

FOREIGN PATENT DOCUMENTS

| CN | 100506372 | * | 7/2009 | |
|----|-----------|---|--------|---|
| CN | 104607230 | * | 5/2015 | |
| CN | 106914237 | A | 7/2017 | |
| CN | 107008290 | A | 8/2017 | |
| CN | 107349937 | * | 11/2017 | |
| CN | 107405612 | A | 11/2017 | |
| CN | 108408762 | A * | 8/2018 | |
| CN | 108777309 | A | 11/2018 | |
| CN | 109014238 | A | 12/2018 | |
| CN | 109939679 | A | 6/2019 | |
| CN | 109999886 | * | 7/2019 | |
| CN | 110449176 | A | 11/2019 | |
| WO | 2004079847 | * | 9/2004 | |
| WO | WO-2004079847 | A2 * | 9/2004 | .......... H01M 14/005 |

OTHER PUBLICATIONS

Pagliaro, et al. "Single Atom Catalyst". Coordination Chemistry Reviews. 2019. https://www.sciencedirect.com/topics/chemistry/single-atom-catalyst#:~:text=Single%2Datom%20alloys%20(SAAs),From%3A%20Coordination%20Chemistry%20Reviews%2C%202022 (Year: 2019).*
Hong, "A Direct one step synthesis . . . ". Int Jour of Hydrogen Energy. 44, 7194-7204 (2019). (Year: 2019).*
Yang Hao et al., "The roles of Ni nanoparticles over CdS nanorods for improved photocatalytic stability and activity", Superlattices and Microstructures, V11, Jul. 9, 2017.
Kong Linggang et.al., "Light-assisted rapid preparation of a Ni/g—C3N4 magnetic composite for robust photocatalytic H2 evolution from water", Journal of Materials Chemistry A, vol. 4, Jun. 2, 2016.

* cited by examiner

*Primary Examiner* — Sheng H Davis
(74) *Attorney, Agent, or Firm* — IPRO, PLLC; Na Xu

(57) ABSTRACT

The disclosure discloses a preparation method and application of a non-noble metal single atom catalyst, and belongs to the technical fields of chemistry, chemical engineering and material science. According to the disclosure, cheap raw materials and simple method are used to prepare the single atom catalyst. In essence, metal is anchored on light-absorbing carrier in a single atom form under irradiation to produce the single atom catalyst. In the disclosure, the non-noble metal single atom catalyst is prepared by using a photochemical synthetic route for the first time. The single atom catalyst synthesized in the disclosure is dispersed on the surface of photoactive substance. Using nickel single atom as a co-catalyst in photocatalytic water splitting to produce hydrogen, the cost is low and the catalytic efficiency is greatly improved compared with other types of non-noble metal modified composite photocatalysts.

9 Claims, 12 Drawing Sheets

PREPARATION METHOD AND APPLICATION OF NON-NOBLE METAL SINGLE ATOM CATALYST

TECHNICAL FIELD

The disclosure relates to a preparation method and application of a non-noble metal single atom catalyst, and belongs to the technical fields of chemistry, chemical engineering and material science.

BACKGROUND

Since global environmental pollution and energy crisis become more and more serious, development of new sustainable energy sources has attracted the attention of countries all over the world. Hydrogen is considered to be the most ideal energy source due to its abundant sources, high combustion value, clean and pollution-free combustion products. Photocatalytic water splitting to produce hydrogen is one of important methods which may realize large-scale production of hydrogen. Photodriven water splitting to produce hydrogen, the solar energy is converted into chemical energy stored in hydrogen energy, so that a cheap and convenient way to obtain hydrogen is provided. However, according to this technology, development of cheap and efficient photocatalysts is the key to photocatalytic water splitting to produce hydrogen.

As well-known effective and stable photocatalysts and electrocatalysts, noble metal catalysts such as platinum are limited in large-scale commercial applications due to high price and low abundance. Therefore, it is very necessary to develop non-noble metal catalysts with high activity, high abundance and high stability. In the past few years, it is shown through many researches that transition metal elements and compounds (sulfides, phosphides, hydroxides) can be used as highly efficient co-catalysts for water splitting to produce hydrogen. Preparation methods of transition metal-based co-catalysts mainly include solvothermal method, calcination method, impregnation method, photochemical method. By using these methods, a variety of directions are provided for rational design and scalable manufacturing of hydrogen production co-catalysts. Compared with other methods, the photochemical method has attracted more attention due to its advantages of simplicity, mildness and efficiency.

Most of hydrogen production co-catalysts are prepared in nanoparticles in the prior art. Since only atoms on the surface of the nanoparticles participate in photocatalytic reaction, the atom utilization of the catalysts is low. By reducing the size of the co-catalysts from nanometer level to single atom form, the atom utilization is expected to be greatly increased, and thus the rate of water splitting to produce hydrogen will be improved. At present, there are no literature reports about preparation of atom-level dispersed non-noble metal co-catalysts by using a photochemical method.

SUMMARY

In order to reduce the preparation cost of hydrogen production catalysts, improve the catalytic performance and increase the atom utilization rate, a simple, mild and low-cost photochemical reduction method is used in the disclosure, a non-noble metal-based single atom catalyst is prepared, the preparation cost is low, and the prepared cocatalyst has good catalytic performance, high stability and high use value.

A first objective of the disclosure is to provide a preparation method of a non-noble metal single atom catalyst. The method includes the following steps: mixing photoactive carrier, metal source and electron donor reagent, and performing the reaction under illumination in a low-concentration oxygen or oxygen-free system to prepare the single atom catalyst. The photoactive carrier is a substance whose electrons can undergo transition or be excited to produce reductive photo-generated electrons under irradiation, and the electron donor reagent is a substance which does not undergo a chemical reaction with the photoactive carrier and the metal source under dark and can undergo a reaction with hole or oxidizing substances generated when electrons undergo transition or are excited of photoactive carrier under irradiation to provide electrons.

In an embodiment of the disclosure, the photoactive carrier is a substance whose electrons can undergo transition or be excited to produce reductive photo-generated electrons after photon energy is absorbed under excitation of irradiation.

In an embodiment of the disclosure, the photoactive carrier may be an organic photoactive substance, an inorganic photoactive substance or a composite photoactive substance.

In an embodiment of the disclosure, the photoactive carrier is selected from any one or more of metal oxides, sulfides, oxyhalides, tungstates and carbonitrides.

In an embodiment of the disclosure, the photoactive carrier is selected from any one or more of $TiO_2$, BiOX (where X is Cl, Br or I), CdX (where X is S, Se or Te), $BiWO_6$, $BiVO_4$, $Cu_2O$, $C_3N_4$, ZnO, ZnS, ZnSe, zinc oxide-ruthenium oxide ($ZnO—RuO_2$), gallite ($CuGaS_2$), gallium phosphide (GaP) and gallium arsenide (GaAs).

In an embodiment of the disclosure, the photoactive carrier may be in a powder form, such as nanowire, nanowire array, nanotube, nanotube array, nanoparticle, porous nanostructure or their combination.

In an embodiment of the disclosure, the metal sources are selected from non-noble metals, including iron, cobalt, nickel, copper, manganese, zinc, aluminum, chromium, molybdenum and tungsten.

In an embodiment of the disclosure, the metal sources are selected from metal salts, including chloride salts, bromide salts, nitrates, nitrites, sulfates, sulfites or acetates In an embodiment of the disclosure, the metal source can be dispersed in the reaction system.

In an embodiment of the disclosure, the electron donor reagent is selected from one or more of methanol, ethanol, isopropanol, thiourea and triethanolamine.

In an embodiment of the disclosure, the selected light source can excite the photoactive carrier and is matched with the photoactive carrier in energy level.

In an embodiment of the disclosure, the wavelength of the irradiation is determined based on requirements of the photoactive carrier. The light source that can provide wavelengths in the range of 200-1300 nm, which can be sunirradiation or artificial light sources, such as xenon lamps, ultraviolet lamps, LED lamps and lasers.

In an embodiment of the disclosure, the low-concentration oxygen or oxygen-free system may be achieved by introducing a certain amount of inert gas for degassing, adding a reducing agent or removing oxygen by vacuuming. Taking measures to reduce the oxygen concentration in the system will help realize the deposition process faster.

In an embodiment of the disclosure, the inert gas may be nitrogen, argon, helium and soon.

In an embodiment of the disclosure, the method is carried out in a solvent system; the electron donor reagent and the metal source are dispersed, partially dissolved or completely dissolved in the solvent system.

In an embodiment of the disclosure, the solvent is water, alcohol, acid or another organic solvent or mixed solvent.

In an embodiment of the disclosure, the reaction is performed under stirring, and stirring includes interval stirring or continuous stirring.

In an embodiment of the disclosure, the method includes the following steps: adding a photoactive substance into a reaction vessel, adding a metal source and an electron donor reagent dispersed or dissolved in a solvent, performing uniform mixing, removing oxygen in a reaction system or introducing an inert gas into the reaction system, and then performing stirring for a reaction under irradiation to prepare the single atom catalyst.

In an embodiment of the disclosure, the method specifically includes the following steps:
(1) adding a photoactive carrier into a reaction vessel, adding a metal source and a hole trapping agent dispersed or dissolved in a solvent, performing mixing, introducing an inert atmosphere for 30-40 minutes to remove oxygen in a reaction system, and then performing stirring during irradiation treatment under a light source;
(2) after a reaction is completed, performing solid-liquid separation, washing and drying to obtain the single atom catalyst.

In an embodiment of the disclosure, the method includes the following steps:
(1) adding cadmium sulfide nanorod into a reaction vessel, adding a mixed aqueous solution of thiourea and nickel acetate, performing uniform mixing, introducing nitrogen for 30-40 minutes to remove oxygen in a reaction system, and then performing irradiation treatment under a xenon lamp during uniform stirring, where the content of nickel is adjusted based on different irradiation times;
(2) after a reaction is completed, performing solid-liquid separation, washing with deionized water 5-8 times and washing with ethanol 1-3 times, and then drying obtain nickel single atom/cadmium sulfide nanorod composite catalyst.

In an embodiment of the disclosure, the cadmium sulfide nanorod is prepared by a hydrothermal method.

In an embodiment of the disclosure, a preparation method of the cadmium sulfide nanorod specifically includes the following steps: adding 2.5 g of hydrated cadmium chloride, thiourea and a certain volume of ethylenediamine into a high-pressure reactor, performing hydrothermal treatment in an oven at 160° C. for 48 hours, cooling to room temperature under natural conditions after a reaction is completed, performing filtration to obtain a yellow solid, performing washing with deionized water 8-10 times and washing with ethanol 1-2 times, and drying in an oven at 60° C. to obtain a yellow solid, namely the cadmium sulfide nanorod.

In an embodiment of the disclosure, the method specifically includes the following steps:
(1) adding a carbon nitride nanosheet into a reaction vessel, adding a mixed aqueous solution of nickel acetate and methanol, performing ultrasonic dispersion, introducing nitrogen for 30-40 minutes to remove oxygen in a reaction system, and then performing irradiation under a xenon lamp during uniform stirring, where the content of nickel is adjusted based on different irradiation times;
(2) after a reaction is completed, performing solid-liquid separation, washing with deionized water 5-8 times and washing with ethanol 1-3 times, and then drying to obtain a nickel single atom/carbon nitride nanosheet composite catalyst.

In some embodiments of the disclosure, the carbon nitride nanosheet is prepared by a calcination method.

In some embodiments of the disclosure, a preparation method of the carbon nitride nanosheet specifically includes the following steps: weighing and adding 1 gram of dicyandiamide and 5 grams of ammonium chloride into a mortar, and performing grinding to thoroughly mix the two substances; placing the obtained solid in a crucible with a cover, placing the crucible in a muffle furnace, and performing heating at 550° C. for 4 hours at a heating rate of 3° C. $min^{-1}$. An obtained irradiation yellow solid is the carbon nitride nanosheet.

A second objective of the disclosure is to provide a single atom catalyst prepared by using the method above.

A third objective of the disclosure is to provide a heterogeneous structure. The heterogeneous structure includes at least one photoactive carrier and another substance generated on the photoactive carrier under irradiation conditions; The preparation of another substance by the step that metal is anchored on the photoactive carrier in a single atom form under illumination; In the preparation process of another substance, the photoactive carrier, metal source and electron donor reagent are necessary, where the photoactive carrier is a substance whose electrons can undergo transition or be excited to produce reductive photo-generated electrons under illumination, and the electron donor reagent is a substance which does not undergo a chemical reaction with the photoactive carrier and the metal source under dark and can undergo a reaction with hole or oxidizing substances generated when electrons undergo transition or are excited of photoactive carrier under irradiation to provide electrons.

In an embodiment of the disclosure, the photoactive carrier may be an organic photoactive substance, an inorganic photoactive substance or a composite photoactive substance.

In an embodiment of the disclosure, the photoactive carrier includes any one or more of metal oxides, sulfides, oxyhalides, tungstates and carbonitrides.

In an embodiment of the disclosure, the photoactive carrier may be any one or more of $TiO_2$, BiOX (where X is Cl, Br or I), CdX (where X is S, Se or Te), $BiWO_6$, $BiVO_4$, $Cu_2O$, $C_3N_4$, ZnO, ZnS, ZnSe, zinc oxide-ruthenium oxide ($ZnO-RuO_2$), gallite ($CuGaS_2$), gallium phosphide (GaP) and gallium arsenide (GaAs).

In an embodiment of the disclosure, the photoactive carrier may be in a powder form, such as nanowire, nanowire array, nanotube, nanotube array, nanoparticle, porous nanostructure or their combination.

In an embodiment of the disclosure, the metal source is selected from non-noble metals, including iron, cobalt, nickel, copper, manganese, zinc, aluminum, chromium, molybdenum and tungsten.

In an embodiment of the disclosure, the metal source is selected from metal salts, including chloride salts, bromide salts, nitrates, nitrites, sulfates, sulfites or acetates.

In an embodiment of the disclosure, the metal source can be dispersed in a reaction system.

In an embodiment of the disclosure, the electron donor reagent includes one or more of methanol, ethanol, isopropanol, thiourea and triethanolamine.

In an embodiment of the disclosure, another substance is prepared in a low-concentration oxygen or oxygen-free system. The concentration of oxygen in the system is reduced by taking measures in a photochemical reaction, and thus great convenience is provided for achieving a deposition process rapidly. For example, a certain amount of an inert gas is introduced for degassing, a reducing agent is added, or oxygen is removed by vacuuming. Taking measures to reduce the oxygen concentration in the system will help realize the deposition process faster.

The disclosure also provides a cell containing the single atom catalyst above.

The disclosure finally provides applications of the single atom catalyst in the field of photocatalysis. Optionally, the application may include catalysis of hydrogen production, catalysis of reduction, catalysis of hydrogen release, catalysis of oxygen reduction, catalysis of oxygen production and catalysis of oxidation. Optionally, the application includes preparation of electrodes and fuel cells.

The Disclosure has the Following Beneficial Effects:
(1) According to the disclosure, cheap raw materials (non-noble metals) and a simple method are used to prepare the single atom catalyst at room temperature, and metal is anchored on the light-absorbing carrier in a single atom form under irradiation. In the disclosure, the non-noble metal single atom catalyst is prepared by photochemical reduction method for the first time.
(2) According to the single atom catalyst prepared in the disclosure, metal atoms are uniformly dispersed on the surface of the photoactive substance, so that the atom utilization of the catalyst is increased; by using nickel single atom as cocatalyst for photocatalytic reaction in the disclosure, the catalytic efficiency is greatly improved, and compared with other types of non-noble metal modified composite photocatalysts, the cocatalyst has higher photocatalytic activity; the single atom catalyst of the disclosure can be used in photocatalytic water splitting to produce hydrogen and the hydrogen production rate is high.

DETAILED DESCRIPTION

The disclosure is described in detail below.

Figure 15:
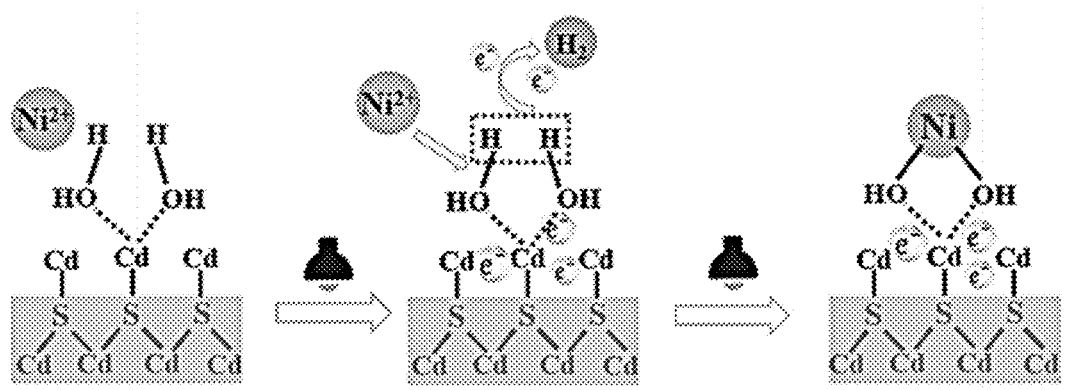
FIG. 15 is a diagram showing a reaction mechanism of the disclosure.

As shown in FIG. 15, the reaction mechanism of the disclosure specifically includes the steps that water molecules are first adsorbed on CdS in an aqueous solution, CdS nanorod absorbs irradiation to generate photo-generated electron-hole pairs under irradiation, then photogenerated electrons are transferred to the surface of the CdS nanorod for reducing $H^+$ to produce $H_2$, and $Ni^{2+}$ is combined with remaining $OH^-$ to finally form Ni(II) loaded on CdS; in addition, electron donor reagent is used to provide electrons to combine with remaining photo-generated holes, and finally, an entire photoreduction process is completed. Therefore, the catalyst prepared in the disclosure has Ni—O bond rather than Ni—Ni bond, has no metal component aggregation state (no Ni—Ni bond), and is a single atom catalyst.

In order to more specifically illustrate the method of the disclosure, examples of the disclosure are given below, but the application of the disclosure is not limited to these aspects.

Example 1: Preparation of Nickel Single Atom/Cadmium Sulfide Nanorod Composite Catalyst The nickel single atom/cadmium sulfide composite catalyst is prepared by the following method.

(1) 20.25 mmol of cadmium chloride hemipentahydrate, 40.75 mmol of thiourea and 60 mL of ethylenediamine were added into a 100 mL high-pressure reactor, and placed in an oven at 160° C. for 48 hours. The reactor was cooled to room temperature under natural conditions, The yellow solid was obtained by washing with deionized water 10 times and washed with ethanol 2 times, and dried in an oven at 60° C. for 12 hours, namely cadmium sulfide nanorod.

(2) 50 mg of cadmium sulfide nanorod was added into a 25 mL flask, and 1 mL of a nickel acetate aqueous solution (12.5 mg/mL), 1 mL of a thiourea aqueous solution (38 mg/mL) and 8 mL of deionized water were then added. Ultrasonic dispersion treatment was performed for 1 minute, and then degassing was performed with nitrogen for 40 minutes to remove oxygen in a reaction system.

(3) After degassing, the flask was irradiated under a 300 W xenon lamp for 20 minutes. The solid was obtained by centrifugation, washing with deionized water 5 times and washing with ethanol 2 times, and dried under nitrogen flow, namely nickel single atom/cadmium sulfide nanorod composite catalyst.

Figure 1:
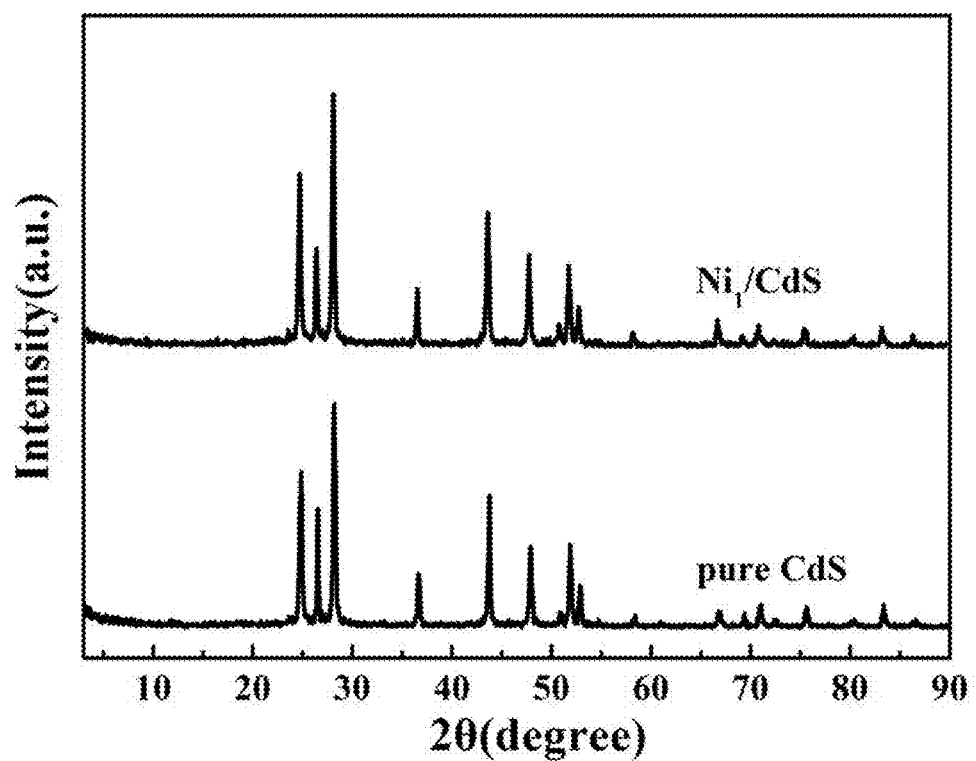
FIG. 1 is the XRD patterns of cadmium sulfide nanorod and $Ni_1$/cadmium sulfide nanorod composite catalyst in Example 1.
Figure 2:
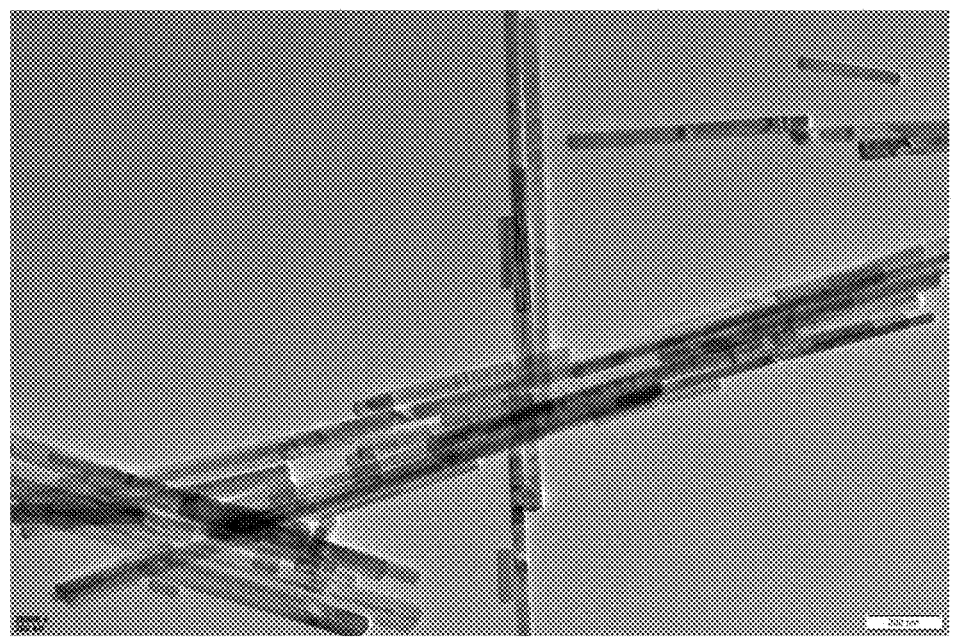
FIG. 2 is the transmission electron microscope image of the $Ni_1$/cadmium sulfide nanorod composite catalyst in Example 1.
Figure 3:
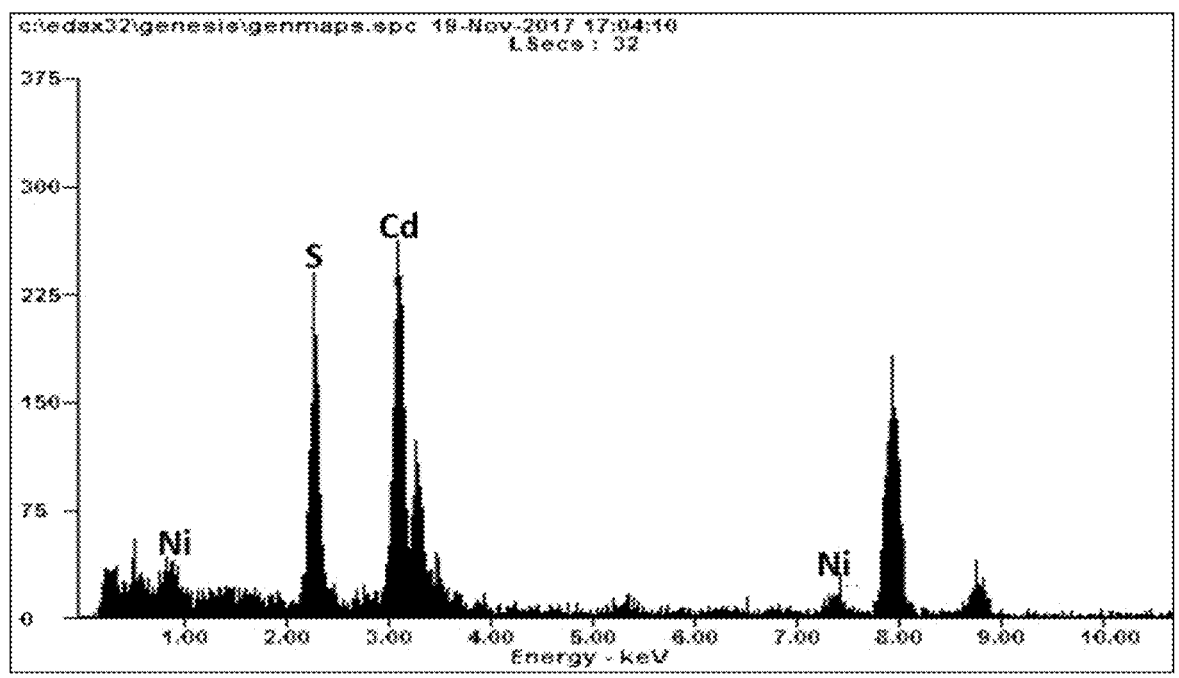
FIG. 3 is the transmission electron microscope energy dispersive X-ray spectrum of the $Ni_1$/cadmium sulfide nanorod composite catalyst in Example 1.
Figure 4:
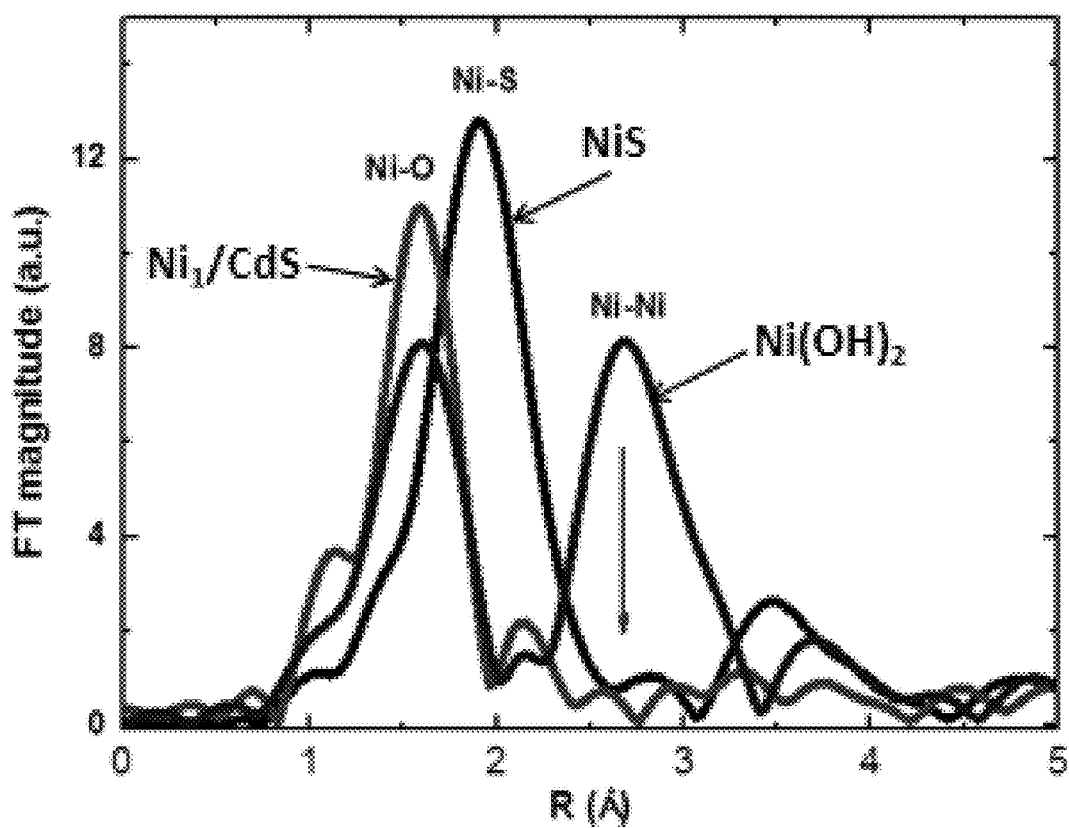
FIG. 4 is the X-ray absorption near-edge structure spectrum of the $Ni_1$/cadmium sulfide nanorod composite catalyst in Example 1.
Figure 5A:
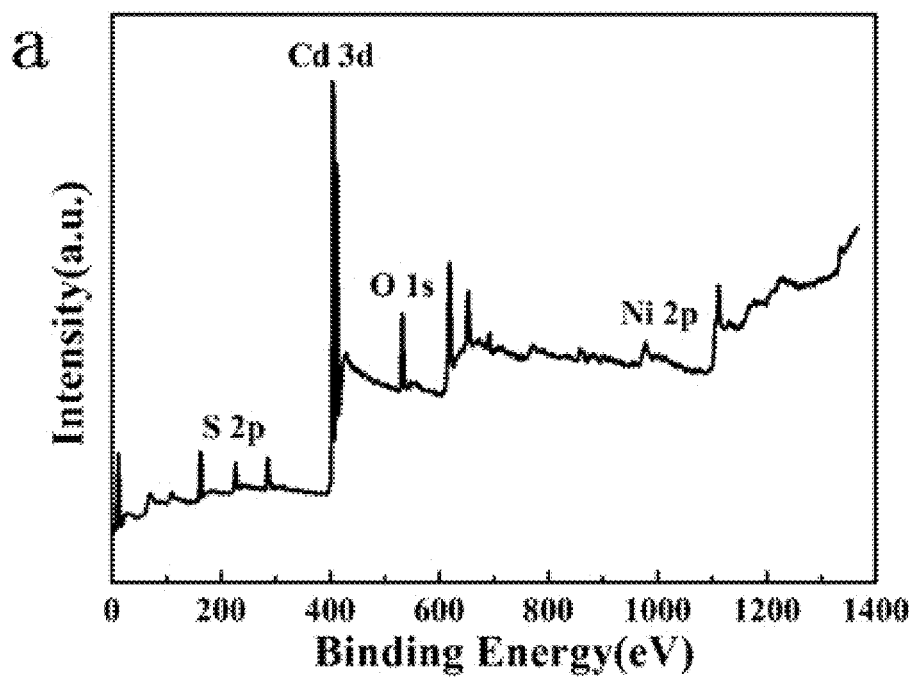
FIG. 5A is the multi-element full spectrum of the $Ni_1$/cadmium sulfide nanorod composite catalyst in Example 1.
Figure 5B:
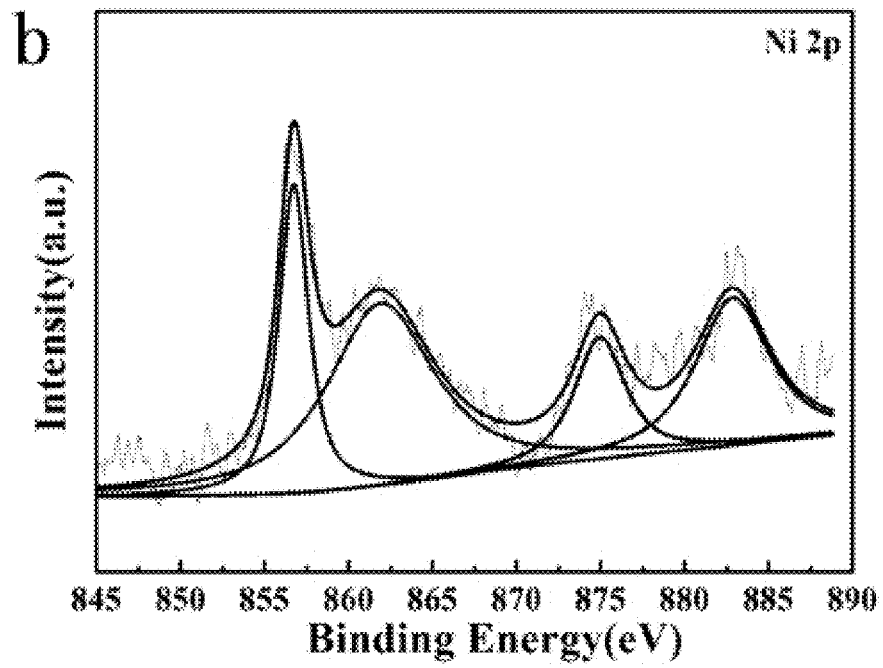
FIG. 5B is the Ni spectrum of the $Ni_1$/cadmium sulfide nanorod composite catalyst in Example 1.
Figure 5C:
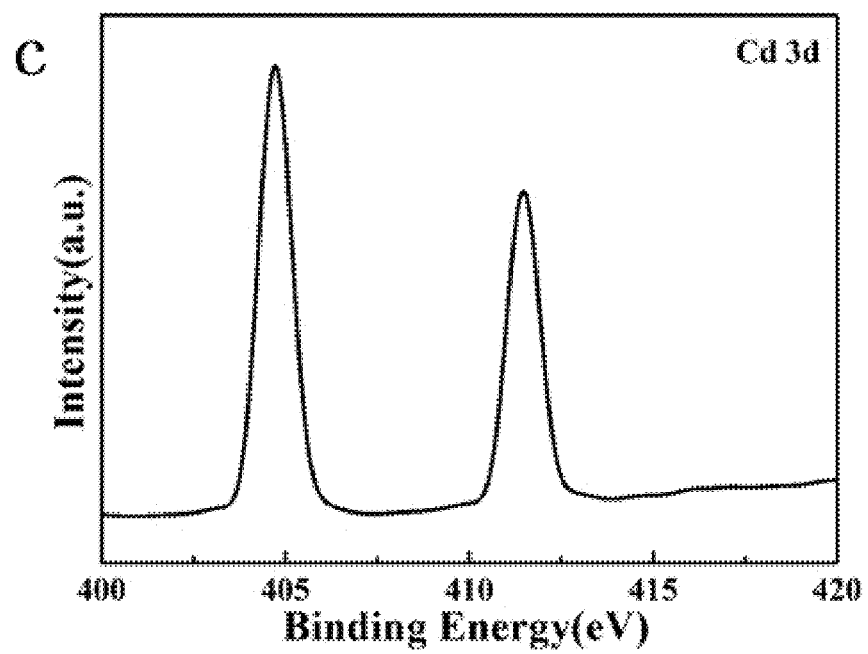
FIG. 5C is the Cd spectrum of the $Ni_1$/cadmium sulfide nanorod composite catalyst in Example 1.
Figure 5D:
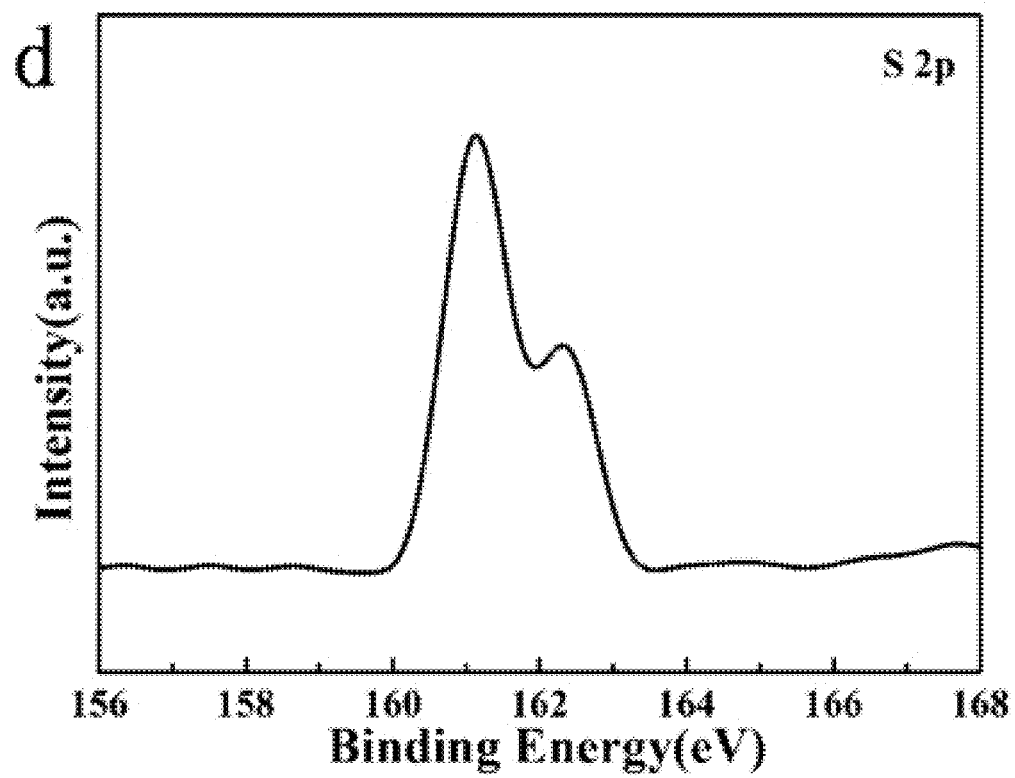
FIG. 5D is the S spectrum of the $Ni_1$/cadmium sulfide nanorod composite catalyst in Example 1.

X-ray diffraction spectra (XRD) (shown in FIG. 1), transmission electron microscope (TEM) images (shown in FIG. 2), energy dispersive X-ray spectrum (EDX) (shown in FIG. 3), X-ray absorption near-edge structure spectrum (XANES) (shown in FIG. 4) and X-ray photoelectron spectra (XPS) (shown in FIG. 5A, FIG. 5B, FIG. 5C and FIG. 5D) of the prepared photocatalyst are obtained. It can be seen that there is divalent nickel element on the cadmium sulfide nanorod, but there are no corresponding X-ray diffraction signals and TEM images, and there is nickel-oxygen bond, but no nickel-nickel bonds. It is proven that nickel on the catalyst prepared in this example is in the form of single metal atom.

Example 2: Catalytic Activity of Nickel Single Atom/Cadmium Sulfide Nanorod Composite Catalyst 2 mg of cadmium sulfide obtained in step (1) of Example 1, 10 mL of lactic acid and 40 mL of water were added into a 100 mL photocatalytic reactor. After ultrasonic treatment for 30 seconds, degassing with nitrogen for 1 hour to remove oxygen in a system, the photocatalytic reactor was irradiated under a 300 W Xenon lamp (equipped with a 420 nm cut-off optical filter). Produced hydrogen in the reaction was detected by thermal conductivity-gas chromatography. After the reaction was performed for 6 hours, the hydrogen production rate was 4.8 mmol·g$^{-1}$·h$^{-1}$.

2 mg of cadmium sulfide obtained in step (1) of Example 1, 10 mL of lactic acid and 40 mL of water were added into a 100 mL photocatalytic reactor. After ultrasonic treatment for 30 seconds, degassing with nitrogen for 1 hour to remove oxygen in a system, the photocatalytic reactor was irradiated under a 300 W Xenon lamp (equipped with a 420 nm cut-off optical filter). Produced hydrogen in the reaction was detected by thermal conductivity-gas chromatography. After the reaction was performed for 6 hours, the hydrogen production rate was 142.7 mmol·g$^{-1}$·h$^{-1}$ and was about 30 times higher than that of the cadmium sulfide nanorod.

Figure 6:
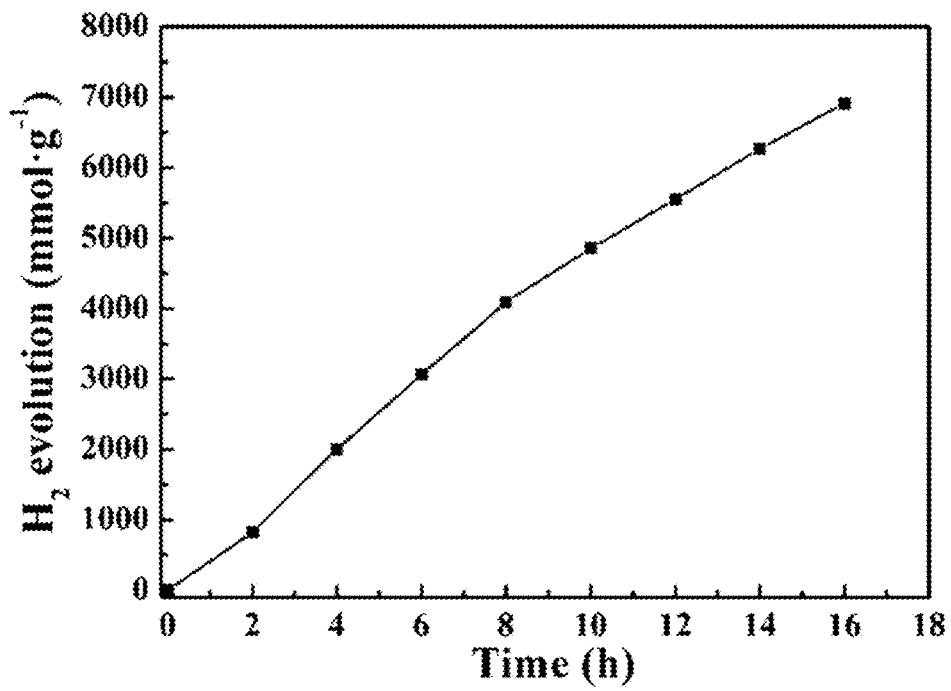
FIG. 6 is the photocatalytic hydrogen production test diagram of $Ni_1$/cadmium sulfide nanorod composite catalyst in Example 2 under visible irradiation.

1 mg of the Ni$_1$/CdS NRs composite catalyst in Example 1, 9.0 g of sodium sulfide nonahydrate, 6.6 g of anhydrous sodium sulfite and 50 mL of deionized water were added into a 100 mL photocatalytic reactor. After ultrasonic treatment for 30 seconds, degassing with nitrogen for 1 hour to remove oxygen in a system, the photocatalytic reactor was irradiated under a 300 W Xenon lamp (equipped with a 420 nm cut-off optical filter). Produced hydrogen in the reaction was detected by thermal conductivity-gas chromatography. Degas every two hours to remove the produced hydrogen, and then irradiation treatment was continued. After the reaction was performed for 16 hours, the catalytic activity was still not reduced significantly. A photocatalytic hydrogen production test diagram of the Ni$_1$/CdS NRs composite catalyst under visible irradiation is shown in FIG. 6.

Figure 7:
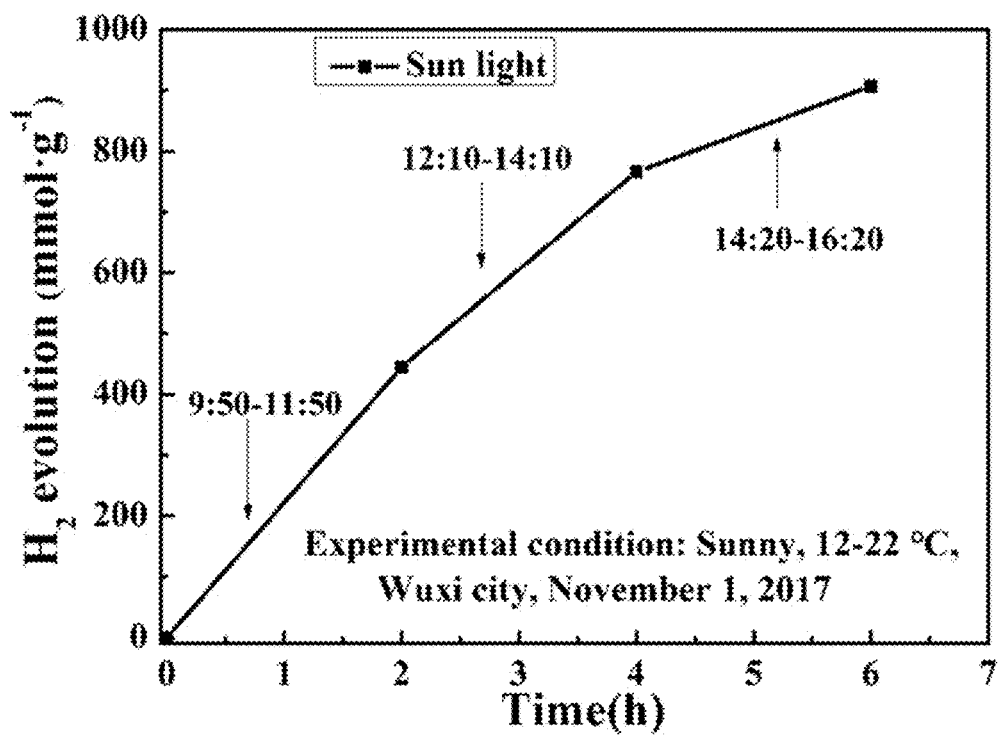
FIG. 7 is the photocatalytic hydrogen production test diagram of the $Ni_1$/cadmium sulfide nanorod composite catalyst in Example 2 under outdoor sunirradiation.

1 mg of the Ni$_1$/CdS NRs composite catalyst in Example 1, 9.0 g of sodium sulfide nonahydrate, 6.6 g of anhydrous sodium sulfite and 50 mL of deionized water were added into a 100 mL photocatalytic reactor. After ultrasonic treatment for 30 seconds, degassing with nitrogen for 1 hour to remove oxygen in a system, the photocatalytic reactor was irradiated under outdoor sunirradiation. The thermal conductivity-gas chromatography was used to detect hydrogen produced in the reaction every 2 hours, and then irradiation treatment was continued. After the reaction was performed for 6 hours, the hydrogen production can reach as high as 900 mmol·g$^{-1}$. A photocatalytic hydrogen production test diagram of the Ni$_1$/CdS NRs composite catalyst under outdoor sunirradiation is shown in FIG. 7.

It can be seen that Ni$_1$/CdS NRs prepared in this example have many advantages, such as simple preparation method, efficient photocatalytic hydrogen production rate, good stability and low cost. The cost can be greatly reduced when Ni$_1$/CdS NRs are applied to industrial production, and Ni$_1$/CdS NRs is a novel catalytic material with a good prospect in industrial photocatalytic production of hydrogen.

Example 3

(1) 20.25 mmol of cadmium chloride hemipentahydrate, 40.75 mmol of thiourea and 60 mL of ethylenediamine were added into a 100 mL high-pressure reactor, and placed in an oven at 160° C. for 48 hours. The reactor was cooled to room temperature under natural conditions, The yellow solid was obtained by washing with deionized water 10 times and washed with ethanol 2 times, and dried in an oven at 60° C. for 12 hours, namely cadmium sulfide nanorod.

(2) 50 mg of cadmium sulfide nanorod, 1 mL of a thiourea aqueous solution (38 mg/mL) and 8 mL of deionized water were added into a 25 mL flask. Ultrasonic dispersion treatment was performed for 1 minute, and then degassing was performed with nitrogen for 40 minutes to remove oxygen in a reaction system.

(3) After degassing, the flask was irradiated under a 300 W xenon lamp for 5, 10, 15 or 20 minutes. The solid was obtained by centrifugation, washing with deionized water 5 times and washing with ethanol 2 times, and dried under nitrogen flow.

It can be determined through tests that all the prepared catalysts are nickel single atom/cadmium sulfide nanorod composite catalysts. The contents (mass percentage) of nickel in the nickel single atom/cadmium sulfide nanorod composite catalysts obtained under different irradiation times are tested. The contents of nickel in the catalysts obtained after irradiation for 5, 10, 15 or 20 minutes are 0.61%, 1.25%, 2.13% and 2.85%, respectively. It can be seen that the content of metal single atoms in the catalyst can be adjusted by changing the irradiation time.

Example 4: Preparation of a Nickel Single Atom/Carbon Nitride Nanosheet Composite Catalyst A nickel single atom/carbon nitride nanosheet composite catalyst is prepared by the following method.

(1) 1 g of dicyandiamide and 5 g of ammonium chloride were added into a mortar, and thoroughly mixed by grinding; the obtained solid after grinding was placed in a crucible with a cover; the crucible was placed in a muffle furnace, and heated at 550° C. for 4 hours at a rate of 3° C. $min^{-1}$ to obtain a irradiation yellow solid, namely carbon nitride nanosheet.

(2) 30 mg of the carbon nitride nanosheet, 0.1 mL of nickel acetate aqueous solution (12.5 mg/mL), 5 mL of anhydrous methanol and 5 mL of deionized water were added into a 25 mL flask. Ultrasonic dispersion treatment was performed for 1 minute, and then degassing was performed with nitrogen for 40 minutes to remove oxygen in the reaction system.

(3) After degassing, the flask was irradiated under a 300 W xenon lamp for 3 hours. The solid was obtained by centrifugation, washing with deionized water 5 times and washing with ethanol 2 times, and dried under nitrogen flow, namely nickel single atom/carbon nitride nanosheet composite catalyst ($Ni_1$/CN).

Figure 8:
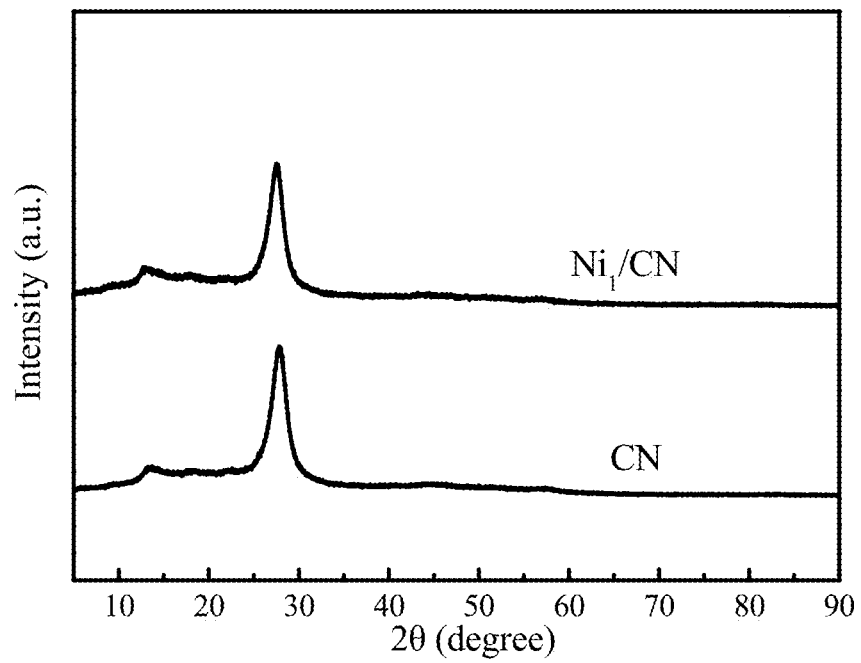
FIG. 8 is the XRD patterns of carbon nitride nanosheet and nickel single atom/carbon nitride nanosheet composite catalyst in Example 4.
Figure 9:
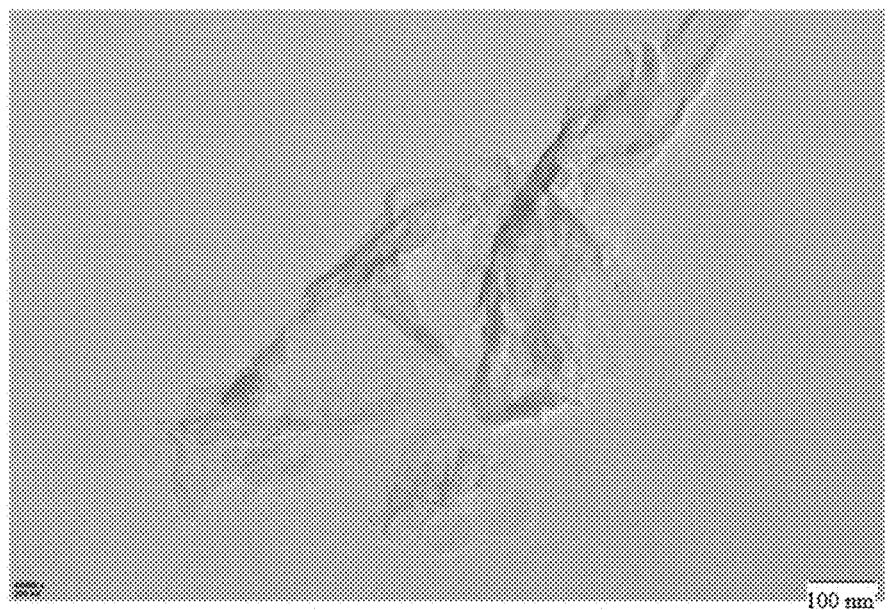
FIG. 9 is the transmission electron microscope image of the nickel single atom/carbon nitride nanosheet composite catalyst in Example 4.
Figure 10:
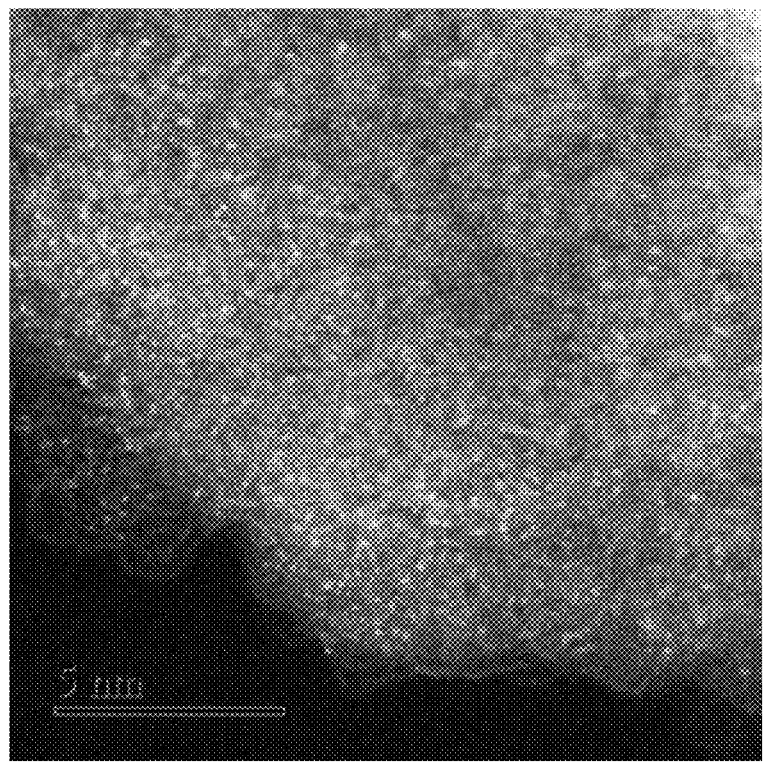
FIG. 10 is the high angle annular dark field-scanning transmission electron microscope image of the nickel single atom/carbon nitride nanosheet composite catalyst in Example 4.
Figure 11:
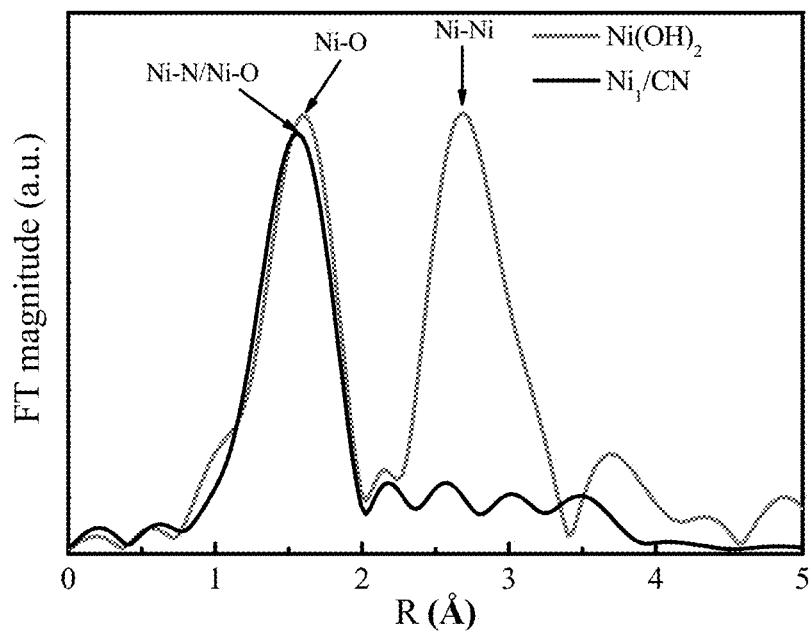
FIG. 11 is the X-ray absorption near-edge structure spectrum of the nickel single atom/carbon nitride nanosheet composite catalyst in Example 4.
Figure 12A:
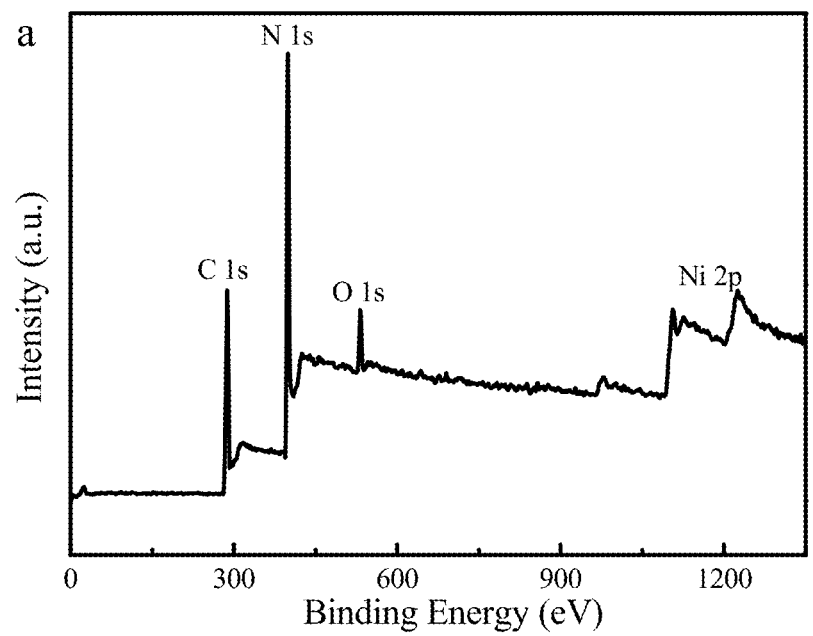
FIG. 12A is the multi-element full spectrum of the nickel single atom/carbon nitride nanosheet composite catalyst in Example 4.
Figure 12B:
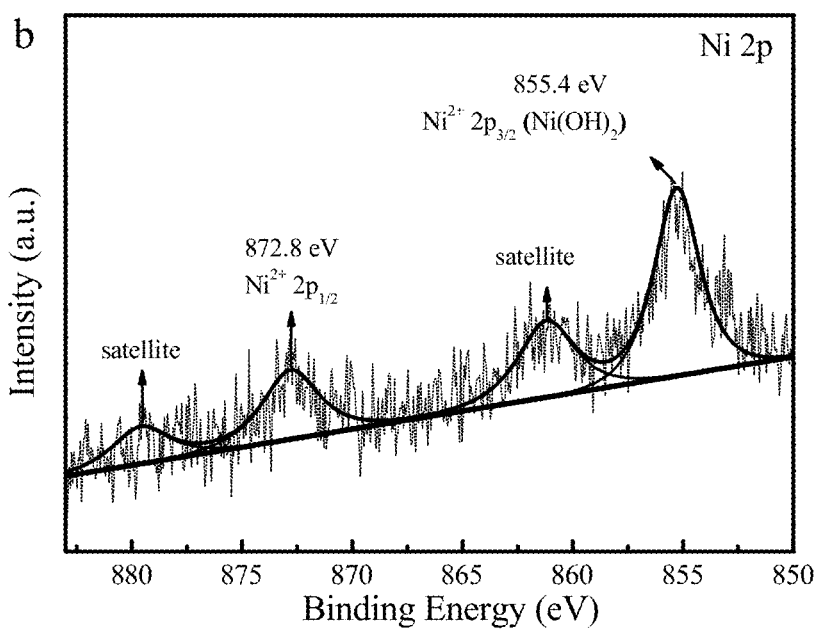
FIG. 12B is the Ni spectrum of the nickel single atom/carbon nitride nanosheet composite catalyst in Example 4.
Figure 12C:
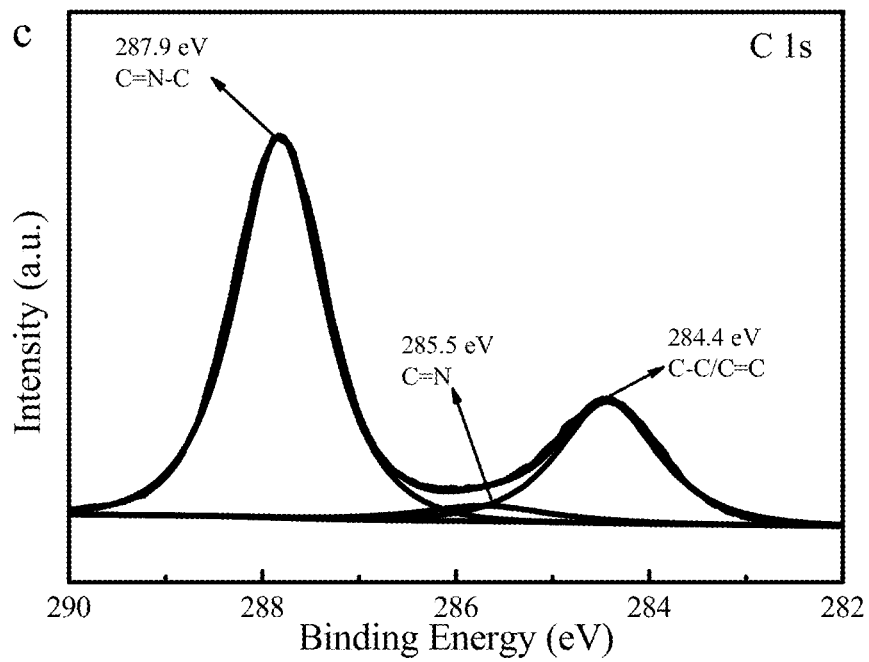
FIG. 12C is the C spectrum of the nickel single atom/carbon nitride nanosheet composite catalyst in Example 4.
Figure 12D:
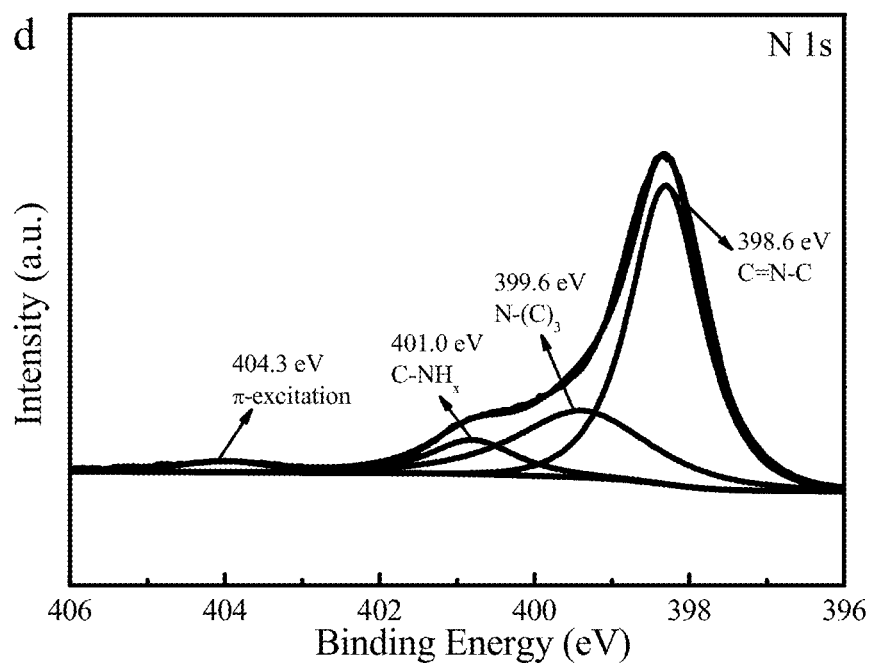
FIG. 12D is the N spectrum of the nickel single atom/carbon nitride nanosheet composite catalyst in Example 4.
Figure 13:
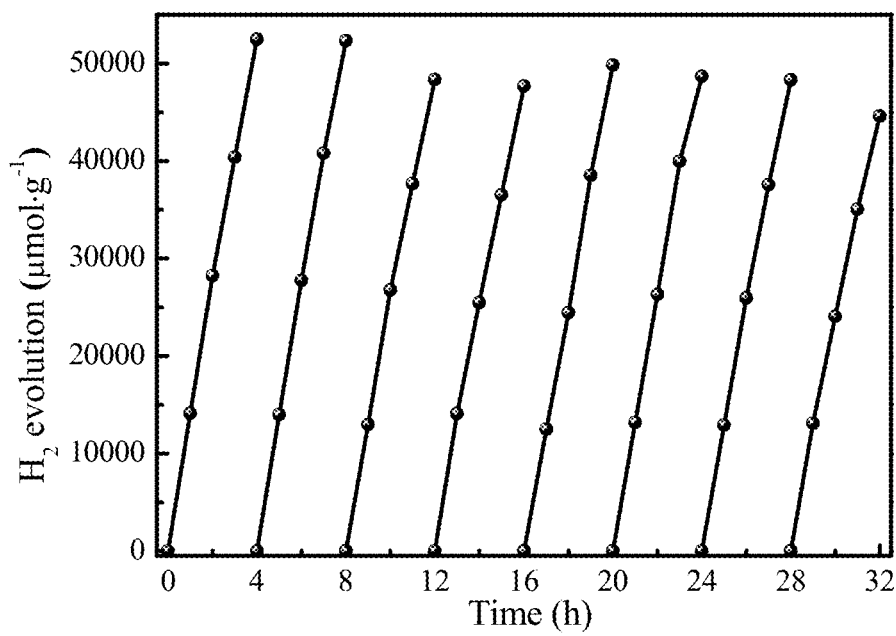
FIG. 13 is the cyclic hydrogen production test diagram of nickel single atom/carbon nitride nanosheet composite catalyst in Example 5 under simulated sunirradiation.
Figure 14:
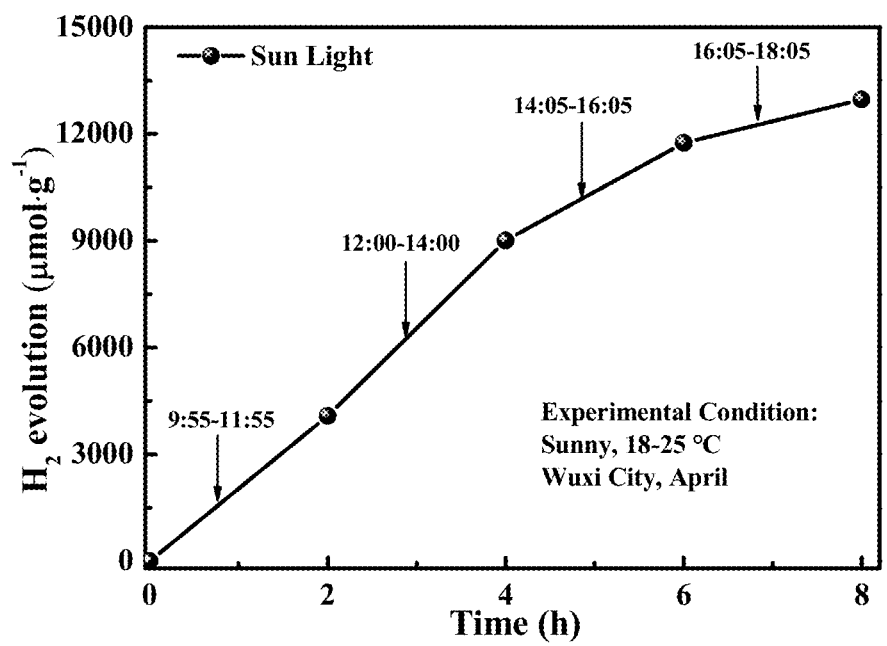
FIG. 14 is the photocatalytic hydrogen production test diagram of the nickel single atom/carbon nitride nanosheet composite catalyst in Example 5 under outdoor sunirradiation.

X-ray diffraction spectra (XRD) (shown in FIG. 8), transmission electron microscope (TEM) image (shown in FIG. 9), high angle annular dark field-scanning transmission electron microscope (HAADF-STEM) image (shown in FIG. 10), X-ray absorption near-edge structure (XANES) spectra (shown in FIG. 11) and X-ray photoelectron (XPS) spectra (shown in FIG. 12A, FIG. 12B, FIG. 12C and FIG. 12D) of the prepared photocatalyst are obtained. It can be seen that there is divalent nickel element on carbon nitride, but there are no corresponding X-ray diffraction signals and Ni nanoparticles in TEM images. There is single nickel atom in the HAADF-STEM image and nickel-oxygen bond, but no nickel-nickel bonds from XANES spectra. It is proven that nickel on the carbon nitride nanosheet prepared in this example is in the form of single metal atom.

Example 5: Catalytic Activity of a Nickel Single Atom/Carbon Nitride Nanosheet 5 mg of the carbon nitride nanosheet obtained in step (1) of Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 2.3 $\mu mol \cdot g^{-1} \cdot h^{-1}$.

5 mg of the $Ni_1$/CN composite catalyst obtained in Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 16500 $\mu mol \cdot g^{-1} \cdot h^{-1}$ and was about 7174 times higher than that of the carbon nitride nanosheet.

5 mg of the $Ni_1$/CN composite catalyst in Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The thermal conductivity-gas chromatography was used to detect hydrogen produced in the reaction every 1 hour, and degassing was performed every 4 hours (one cycle) to remove hydrogen in the reaction system, and then irradiation treatment was continued. After the reaction was performed for 32 hours, the catalytic activity was still not reduced significantly.

5 mg of the $Ni_1$/CN composite catalyst in Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under outdoor sunirradiation. The produced hydrogen was detected by thermal conductivity-gas chromatography every 2 hours and removed by degassing, and then irradiation treatment was continued. After the reaction was performed for 6 hours, the hydrogen production can reach as high as 11.8 $mmol \cdot g^{-1}$.

It can be seen that $Ni_1$/CN composite catalyst prepared in this example have many advantages, such as simple preparation method, efficient photocatalytic hydrogen production rate, good stability and low cost. The cost can be greatly reduced when $Ni_1$/CdS NRs are applied to industrial production, and $Ni_1$/CdS NRs is a novel catalytic material with a good prospect in industrial photocatalytic production of hydrogen.

Example 6

When the irradiation time is 1 hour and 2 hours respectively, other operations and steps are the same as those in Example 4, and nickel single atom/carbon nitride nanosheet composite catalysts are prepared.

The contents (mass percentage) of nickel in the nickel single atom/carbon nitride nanosheet composite catalysts obtained under different irradiation times are tested. The contents of nickel in the catalysts obtained after irradiation for 1, 2 or 3 hours (Example 4) are 0.05%, 0.03% and 0.21%, respectively. It can be seen that the content of metal single atoms in the catalyst can be adjusted by changing the irradiation time.

Example 7

(1) 30 mg of the carbon nitride nanosheet, 0.1 mL of cobalt acetate aqueous solution (12.5 mg/mL), 5 mL of anhydrous methanol and 5 mL of deionized water were added into a 25 mL flask. Ultrasonic dispersion treatment was performed for 1 minute, and then degassing was performed with nitrogen for 40 minutes to remove oxygen in the reaction system. The flask was irradiated under a 300 W xenon lamp for 3 hours. The solid was obtained by centrifugation, washing with deionized water 5 times and washing with ethanol 2 times, and dried under nitrogen flow, namely cobalt single atom/carbon nitride nanosheet composite catalyst ($Co_1$/CN).

(2) 5 mg of the carbon nitride nanosheet obtained in step (1) of Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 2.3 $\mu mol \cdot g^{-1} \cdot h^{-1}$.

(3) 5 mg of the $Co_1$/CN composite catalyst obtained in step (1) of Example 7, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 708.9 $\mu mol \cdot g^{-1} \cdot h^{-1}$.

Figure 16:
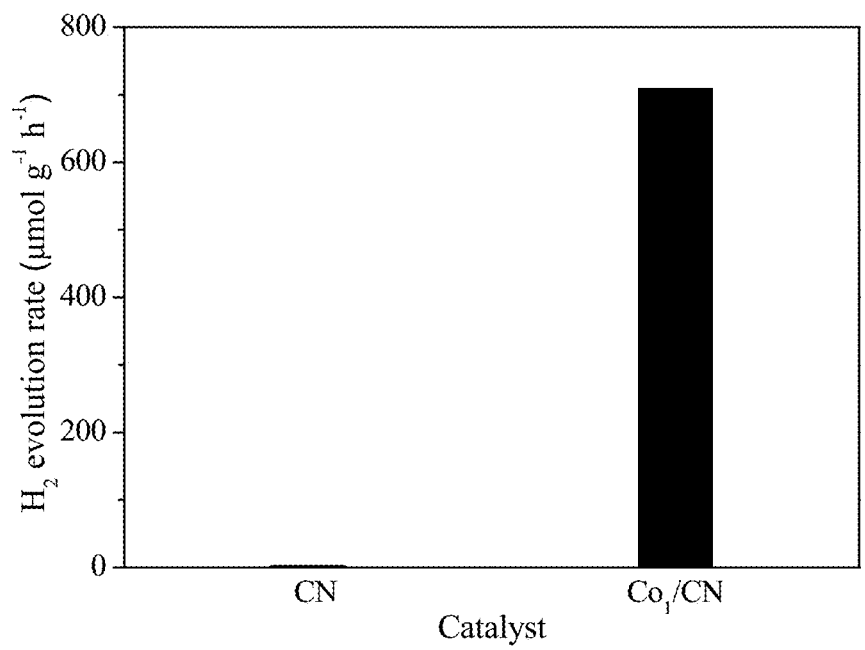
FIG. 16 is the photocatalytic hydrogen production test diagram of a $Co_1$/CN catalyst in Example 7 under simulated sunirradiation.

According to test results shown in FIG. 16, after the reaction was performed for 1 hour, the hydrogen production rate of $Co_1$/CN reached 708.9 $\mu mol \cdot g^{-1} \cdot h^{-1}$, and the hydrogen production rate of CN without Co loaded was only 2.3 $\mu mol \cdot g^{-1} \cdot h^{-1}$.

Example 8

The light-absorbing carriers in Examples 1 and 4 were changed into $TiO_2$, BiOX (where X is Cl, Br or I), CdX (where X is S, Se or Te), $BiWO_6$, $BiVO_4$, $Cu_2O$, $C_3N_4$, ZnO, ZnS, ZnSe, zinc oxide-ruthenium oxide ($ZnO-RuO_2$), gallium sulfide ($CuGaS_2$), gallium phosphide (GaP) or gallium arsenide (GaAs), and the metal was changed into iron, cobalt, copper, manganese, zinc, aluminum, chromium, molybdenum or tungsten. Single metal atom catalysts can be obtained by adjusting conditions, and good catalytic performance can also be achieved. More details are not described here.

Comparative Example 1

In order to verify the necessity of the electron donor reagent in the disclosure, a control experiment without the electron donor reagent was carried out.

(1) 20.25 mmol of cadmium chloride hemipentahydrate, 40.75 mmol of thiourea and 60 mL of ethylenediamine were added into a 100 mL high-pressure reactor, and placed in an oven at 160° C. for 48 hours. The reactor was cooled to room temperature under natural conditions, The yellow solid was obtained by washing with deionized water 10 times and washed with ethanol 2 times, and dried in an oven at 60° C. for 12 hours, namely cadmium sulfide nanorod.

(2) 50 mg of cadmium sulfide nanorod, 1 mL of a nickel acetate aqueous solution (12.5 mg/mL), 9 mL of deionized water were added into a 25 mL flask. Ultrasonic dispersion treatment was performed for 1 minute, and then degassing was performed with nitrogen for 40 minutes to remove oxygen in a reaction system.

(3) After degassing, the flask was irradiated under a 300 W xenon lamp for 20 minutes. The solid was obtained by centrifugation, washing with deionized water 5 times and washing with ethanol 2 times, and dried under nitrogen flow. Relevant characterizations showed that the prepared material was not single atom catalyst.

Similarly, no nickel single atom composite catalyst could be prepared by using the preparation method in Example 4 when methanol was changed into equal volume of water.

It can be seen that the electron donor reagent in the disclosure is necessary for preparation of the single atom catalyst.

Comparative Example 2

Common non-photoactive carrier materials such as Y-type molecular sieves, porous alumina, porous silica, coal-based activated carbon, biomass activated carbon, carbon fibers, carbon nanotubes, nickel acetate solution, thiourea solution and deionized water were mixed by ultrasound. After degassing with nitrogen, the mixture was irradiated under a 300 W xenon lamp for 20-100 minutes, but no non-noble metal single atom could be deposited on these non-photoactive carriers through the photochemical method similar to Example 1.

It can be seen that in order to prepare the non-noble metal single atom catalyst in the disclosure, it is necessary to add the photoactive carrier whose electrons can undergo transition or be excited to generate reductive photo-generated electrons under irradiation.

Comparative Example 3

When thiourea in Example 1 was changed into a sodium borohydride aqueous solution (1 mL, 19 mg/mL) with higher reduction property and other operation steps and methods were the same as those in Example 1, non-noble metal single atom catalyst could not be prepared.

When methanol in Example 4 was changed into hydrazine hydrate and other operation steps and methods were the same as those in Example 4, non-noble metal single atom catalyst could not be prepared.

It can be seen that selection of the electron donor reagent is also very important. The electron donor reagent required in the disclosure cannot undergo chemical reaction with the photoactive carrier and the metal source under dark, but can undergo a reaction with hole or oxidizing substances generated when electrons undergo transition or are excited of photoactive carrier under irradiation to provide electrons.

Comparative Example 4

It is found that non-noble metal single atom catalyst could not be prepared through the experiment process in Example 1 without irradiation. It is indicated that irradiation is also necessary for preparation of the single atom catalyst in the disclosure.

Comparative Example 5

In order to verify the effect of the obtained single atom catalyst reduced by high-temperature hydrogen, this control experiment was carried out.

(1) 0.2 g of the $Ni_1$/CN composite catalyst obtained in Example 4 was added into a porcelain boat, placed in a tube furnace and heated at a heating rate of 10° C./min under a 5% $H_2$/Ar mixed gas atmosphere and then kept at 300° C. for 1 hour to obtain a solid, namely $Ni_1$/CN composite material reduced by hydrogen.

(2) 5 mg of the $Ni_1$/CN composite catalyst obtained in Example 4, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 16500 $\mu mol \cdot g^{-1} \cdot h^{-1}$.

(3) 5 mg of the $Ni_1$/CN composite catalyst reduced by hydrogen obtained in step (1) of Comparative Example 5, 2 mL of triethanolamine and 8 mL of water were added into a 25 mL flask. Ultrasonic treatment was performed for 30 seconds, and degassing was performed with nitrogen for 1 hour to remove oxygen in a system. The flask was irradiated under a 300 W xenon lamp (equipped with an AM 1.5 optical filter). The produced hydrogen was detected by thermal conductivity-gas chromatography. The hydrogen production rate was 62.9 $\mu mol \cdot g^{-1} \cdot h^{-1}$.

Figure 17:
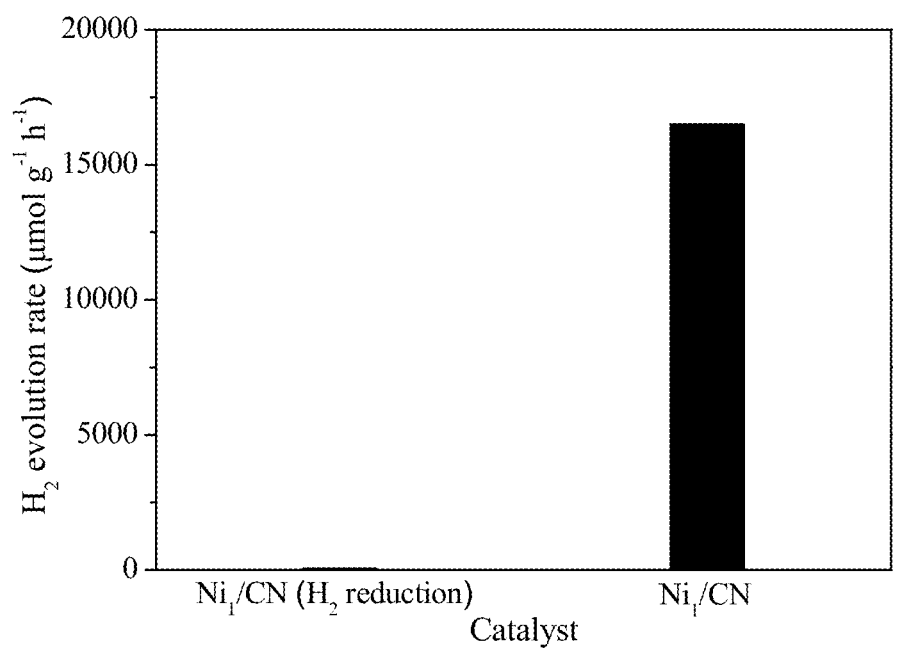
FIG. 17 is a photocatalytic hydrogen production test diagram of a $Ni_1$/CN catalyst reduced by hydrogen in Comparative Example 5 under simulated sunirradiation.

According to test results shown in FIG. 17, it can be seen that after the reaction is performed for 6 hours, the hydrogen production rate of the $Ni_1$/CN composite material reduced by hydrogen is only 62.9 $\mu mol \cdot g^{-1} \cdot h^{-1}$ and is only 0.38% of that (16500 $\mu mol \cdot g^{-1} \cdot h^{-1}$) of unreduced $Ni_1$/CN. It is indicated that the single atom catalyst with a positive valence obtained in the disclosure is highly active and is better than a reduced simple substance.

What is claimed is:

1. A preparation method of a non-noble metal single atom catalyst, comprising:
    (aa) mixing by ultrasound 0.1 mL of a 12.5 mg/mL nickel acetate aqueous solution, 5 mL of absolute methanol, 5 mL of water, and 30 mg of a nitrogen carbide nanosheet in the reaction vessel,
    (bb) degassing the reaction vessel with nitrogen;
    (cc) illuminating the reaction vessel with a 300 W xenon lamp for 1, 2, or 3 hours; and
    (dd) performing a solid-liquid separation, followed by washing with deionized water and with ethanol, and drying to obtain the non-noble metal single atom catalyst,
    wherein the photoactive carrier is a photoactive substance whose electrons can undergo transition or be excited to produce reductive photo-generated electrons under irradiation,
    wherein the electron donor reagent is a substance that does not undergo a chemical reaction with the photoactive carrier and the metal source under dark conditions, and
    wherein the electron donor reagent reacts with a hole or oxidizing substances generated when electrons transition or are excited by the photoactive carrier under irradiation to provide electrons.

2. The preparation method according to claim 1, wherein a light source excites the photoactive carrier and is matched with the photoactive carrier in energy level, and
    wherein the light source provides wavelengths within a wavelength range of 200 nm to 1300 nm.

3. The preparation method according to claim 1, further comprising
    adding to the reaction vessel a hole trapping agent dispersed or dissolved in a solvent.

4. The preparation method according to claim 1, wherein the cadmium sulfide nanorod is prepared by a hydrothermal method, which comprises:
    adding 2.5 g of hydrated cadmium chloride, thiourea, and ethylenediamine into a high-pressure reactor,
    exposing to heat in an oven at 160° C. for 48 hours,
    cooling to room temperature,
    filtering to obtain a yellow solid,
    washing the yellow solid with deionized water and with ethanol, and
    drying in an oven at 60° C. to obtain the cadmium sulfide nanorod.

5. The preparation method according to claim 1, wherein the carbon nitride nanosheet is prepared by a calcination method, comprises the following steps:
    weighing and adding 1 gram of dicyandiamide and 5 grams of ammonium chloride into a mortar, and
    grinding to the dicyandiamide and the ammonium chloride to obtain a ground solid;
    covering the ground solid in a crucible, and
    heating the crucible in a muffle furnace at 550° C. for 4 hours at a heating rate of 3° C. $min^{-1}$.

6. The preparation method according to claim 1, wherein the ultrasonic dispersion time is 1 minute.

7. The preparation method according to claim 1, wherein the degassing is performed for 30 to 40 minutes.

8. The method according to claim 1, wherein the cadmium sulfide nanorod is prepared by:
    adding 20.25 mmol of cadmium chloride hemipentahydrate, 40.75 mmol of thiourea, and 60 mL of ethylenediamine into a 100 mL high-pressure reactor to obtain a reaction mixture,
    heating the reaction mixture in an oven at 160° C. for 48 hours;
    cooling the reaction mixture to room temperature;
    washing with deionized water and ethanol; and
    drying in at 60° C. for 12 hours to obtain the cadmium sulfide nanorod.

9. The preparation method according to claim 1, wherein the carbon nitride nanosheet is prepared by:
    adding 1 g of dicyandiamide and 5 g of ammonium chloride into a mortar,
    mixing thoroughly by grinding to obtain a ground solid;
    covering the ground solid in a crucible; and
    heating the crucible at 550° C. for 4 hours at a rate of 3° C. $min^{-1}$ to obtain the carbon nitride nanosheet.

* * * * *